(12) United States Patent  
Lucidarme et al.

(10) Patent No.: US 8,428,167 B2  
(45) Date of Patent: *Apr. 23, 2013

(54) METHOD OF ESTIMATING THE SYMBOLS OF A DIGITAL SIGNAL AND RECEIVER FOR IMPLEMENTING SAID METHOD

(75) Inventors: Thierry Lucidarme, Montigny le Bretonneaux (FR); Nidham Ben Rached, Paris (FR)

(73) Assignee: Apple, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,401

(22) Filed: Aug. 13, 2012

(65) Prior Publication Data

US 2012/0307946 A1 Dec. 6, 2012

Related U.S. Application Data

(63) Continuation of application No. 13/160,764, filed on Jun. 15, 2011, now Pat. No. 8,295,376, which is a continuation of application No. 11/547,536, filed on Aug. 13, 2007, now Pat. No. 7,986,737.

(51) Int. Cl.  
*H04K 1/10* (2006.01)

(52) U.S. Cl.  
USPC ........... 375/260; 375/259; 375/316; 375/342; 375/308; 375/355; 370/208; 370/335; 370/342

(58) Field of Classification Search .................. 375/260, 375/259, 316, 342, 308, 355; 370/208, 335, 370/342  
See application file for complete search history.

(56) References Cited

U.S. PATENT DOCUMENTS

| | | | |
|---|---|---|---|
| 6,269,132 B1 * | 7/2001 | Yonge, III | 375/346 |
| 7,099,265 B2 | 8/2006 | Kuwabara et al. | |
| 7,203,244 B2 | 4/2007 | Alcouffe | |
| 7,215,636 B2 | 5/2007 | Seo et al. | |
| 7,301,890 B2 | 11/2007 | Joo et al. | |
| 7,310,503 B2 | 12/2007 | Ido | |

* cited by examiner

*Primary Examiner* — Zewdu Kassa  
(74) *Attorney, Agent, or Firm* — Meyertons, Hood, Kivlin, Kowert & Goetzel, P.C.; Eric B. Meyertons

(57) ABSTRACT

The invention relates to a method of estimating symbols carried by a digital signal that is received by a receiver over a communication channel (5), said symbols being multiplexed or orthogonal frequency sub-carriers. The inventive method comprises the following steps in relation to each symbol carried by the digital signal, consisting in: performing at least two transforms towards the frequency domain (8,9) on a portion of the received signal essentially corresponding to the symbol, said transforms being performed with a determined time lag (10) therebetween: estimating the parameters ($r_0$, $r_1, \ldots, r_n, r'_0, r'_1, \ldots, r'_n$) of the communication channel from pre-determined binary information contained in the digital signal; and estimating the symbol from a combination of the result of each of the transforms performed and the estimated communication channel parameters.

20 Claims, 3 Drawing Sheets

METHOD OF ESTIMATING THE SYMBOLS OF A DIGITAL SIGNAL AND RECEIVER FOR IMPLEMENTING SAID METHOD

PRIORITY CLAIM

This application is a continuation of U. S. application Ser. No. 13/160,764, filed on Jun. 15, 2011 now U.S. Pat. No. 8,295,376, which is a continuation of U.S. application Ser. No. 11/547,536, filed on Aug. 13, 2007, now U. S. Pat. No. 7,986,737, all of which are hereby incorporated herein by reference as full set forth.

This invention relates to the estimation by a receiver of symbols carried by a digital signal. It more particularly relates to the estimation of transmitted symbols using OFDM (Orthogonal Frequency Division Multiplexing) technology.

OFDM technology is a well-known technique that consists of multiplexing the data to be sent over a communication channel on frequency sub-carriers. The sub-carriers are separated by a guard band so as to reduce the interference therebetween. They are also orthogonal to one another due to the fact that the minimum duration of a piece of information carried by each sub-carrier is the inverse of the value of the guard band.

OFDM is in particular used in digital audio broadcasting (DAB) and digital video broadcasting (DVB) systems, high-speed local wireless networks, and DSL (digital subscriber line) wired digital networks. There are also current plans to use this technology in cellular radiocommunication networks such as UMTS (Universal Mobile Telecommunication System).

FIG. 1 illustrates the general principles of a transmission carried out using OFDM technology. A signal carrying data must be transmitted by a transmitter 1, to be received and interpreted by a receiver 2. The data carried by the signal include a succession of binary elements.

$X_n$ designates a quantity of data in series to be transmitted. In a first step, a module 3 transforms this series stream into a plurality of N parallel streams $X_{n,0}, X_{n,1}, \ldots, X_{n,N-1}$ As an illustration, each of these parallel streams may consist of a set of binary elements having a duration equal to $T_u$. An inverse fast Fourier transform (IFFT) 4 is then performed in the transmitter 1 from the N parallel streams $X_{n,0}, X_{n,1}, \ldots X_{n,N-1}$. At the end of this operation, an OFDM symbol $s_m$ having a duration equal to $T_u$ is obtained. This OFDM symbol appears in the form of a set of coded binary information on frequencies separated by a guard band as indicated above.

The OFDM symbol $s_m$ is then sent by the transmitter 1 over a communication channel 5 which may be of various types, such as a radio channel for example. The receiver 2 tuned to the channel 5 then receives a symbol $\hat{s}_m$ corresponding to the transmitted OFDM symbol $s_m$, except for disturbances introduced by the channel or by external interferences.

A fast Fourier transform 6, or FFT, is then performed on the portion of the received signal corresponding to the symbol $\hat{s}_m$. Data elements $\hat{X}_{n,0}, \hat{X}_{n,1}, \ldots \hat{X}_{n,N-1}$ are estimated from said symbol, each data element corresponding to the data transmitted by a given frequency sub-carrier. Then a parallel-to-series conversion 7 makes it possible to obtain an estimate $\hat{X}_n$ of the transmitted data $X_n$.

In addition, it is common to use a guard time interval in each OFDM symbol in order to reduce inter-symbol interference (ISI). In effect, when the communication channel over which the signal is sent contains multiple paths, as is generally the case for a radio channel, the signal may be received several times at the receiver with respective delays corresponding to the various paths. This therefore results in some degree of overlap between signal portions relating to successive OFDM symbols, liable to make estimating the transmitted data more difficult and therefore to degrade the quality of the reception.

The guard time interval therefore consists of increasing the duration of each pertinent OFDM symbol by duplicating at the end of the symbol some binary elements placed at the beginning of that symbol, or vice-versa. The duration $T_s$ of such an elongated symbol is equal to $T_u+T_g$, where $T_g$ designates the duration of the guard time interval selected to offset the overlap between the signal portions relating to successive OFDM symbols. The receiver then takes advantage of the duplication of some binary elements in order to improve the estimate of the pertinent data from each symbol.

When a signal carrying OFDM symbols is received, a problem occurs in minimizing the residual ISI in spite of the use of a guard time interval in the symbols as indicated above. It involves positioning in time the FFT calculation window for each OFDM symbol received, said window having a duration equal to $T_u$ i.e., less than the duration $T_s=T_u+T_g$ of an OFDM symbol including a guard time interval. In effect, even when several signal echoes corresponding to respective paths of the communication channel are received at the receiver, only one FFT is performed for each OFDM symbol.

The positioning of the time window on which the FFT is performed for a given symbol is therefore a delicate question, because it depends on the number of paths on the channel involved, the quantity of energy received relative to each of the paths, and the time-distribution of said paths. Furthermore, the poor positioning of this window is liable to severely degrade the reception quality of the transmitted signal because of the ISI created by the presence in that window of signal portions relating to symbols other than the symbol being estimated.

This problem has been studied, for example in the article "OFDM receivers; impact on coverage of inter-symbol interference and FFT window positioning" by R. Brugger and D. Hemingway, published in the "EBU technical review" in July 2003. This article proposes several strategies for positioning the FFT calculation window in a digital audio (DAB) or video (DVB) broadcasting system, and assesses the performance of each such strategy, particularly in terms of inter-symbol interference.

In this article, a pulse response from the communication channel is estimated in order to identify the principal paths traveled by the transmitted signal, then the FFT calculation window is respectively positioned according to one of the following strategies: relative to the path exhibiting the highest energy, relative to the first path exhibiting an energy higher than a threshold, relative to a center of gravity obtained from the various identified paths, or relative to a path exhibiting a maximum signal-to-interference ratio.

However, inter-symbol interference still exists in the various disclosed strategies for positioning the FFT calculation window.

In addition, these strategies rely on static criteria, determined once and for all. They are well-suited for communication channels that vary little, i.e., in which the path distribution is essentially constant. However, when the communication channel involved is a channel used in a mobile radiocommunication system, it can be very changeable over time depending, for example, on the mobility of the transmitter or the receiver, and on the environment. In this case, an initial determination of the time positioning of the FFT calculation window using a static criterion could quickly become inappropriate.

One objective of this invention is to mitigate the aforesaid disadvantages.

Another objective of the invention is to improve the estimate of the symbols carried by a signal received by a receiver when OFDM technology is used.

Another objective of the invention is to improve the estimate of the symbols carried by a signal sent over a communication channel whose characteristics vary, such as a radio channel in a mobile radiocommunication system.

The invention thus proposes a method of estimating the symbols carried by a digital signal received by a receiver over a communication channel, the symbols being multiplexed on orthogonal frequency sub-carriers. The method comprises the following steps relating to each symbol carried by the digital signal:
- perform at least two transforms towards the frequency domain on a portion of the received signal essentially corresponding to said symbol, said transforms being performed with a given time lag therebetween;
- estimate parameters of the communication channel from predetermined binary information contained in the digital signal; and
- estimate said symbol from a combination of the result of each of the transforms performed and the estimated communication channel parameters.

The calculation and the combination of two or more transforms, for example fast Fourier transforms, staggered in time, makes it possible to obtain pertinent data over a longer time span, which increases the reliability of the estimate of the data contained in the OFDM symbols transmitted.

The method may, for example, be used in a mobile radiocommunication system. In this case, the communication channel involved is a radio channel.

The time lag between the transforms can be determined, for example, from the characteristics of an environment in which the communication channel is located. It may also be selected based on an analysis of the estimated pulse response of the communication channel.

The time positioning of the calculation window of a first FFT may also be selected based on the estimated pulse response of the communication channel.

The invention also proposes a receiver containing means to implement the aforesaid method.

The invention further proposes a computer program product to be installed in a receiver, including instructions for implementing said method when running the program using means of processing of the receiver.

Other particularities and benefits of this invention will appear in the following description of non-limiting examples of implementation, referring to the attached drawings, in which:

FIG. 1, already commented, is a diagram illustrating a signal transmission-reception sequence using OFDM multiplexing technology;

Consider a receiver capable of receiving digital signals carrying multiplexed symbols according to OFDM technology. Said receiver may, for example, be part of a communication station of a wired communication system. In another embodiment illustrated in FIG. 2, the receiver is part of a mobile communication system, for example a base station or a mobile terminal supporting UMTS technology. In this case, it receives digital radio signals at an antenna or an array of antennas 16.

Figure 2:
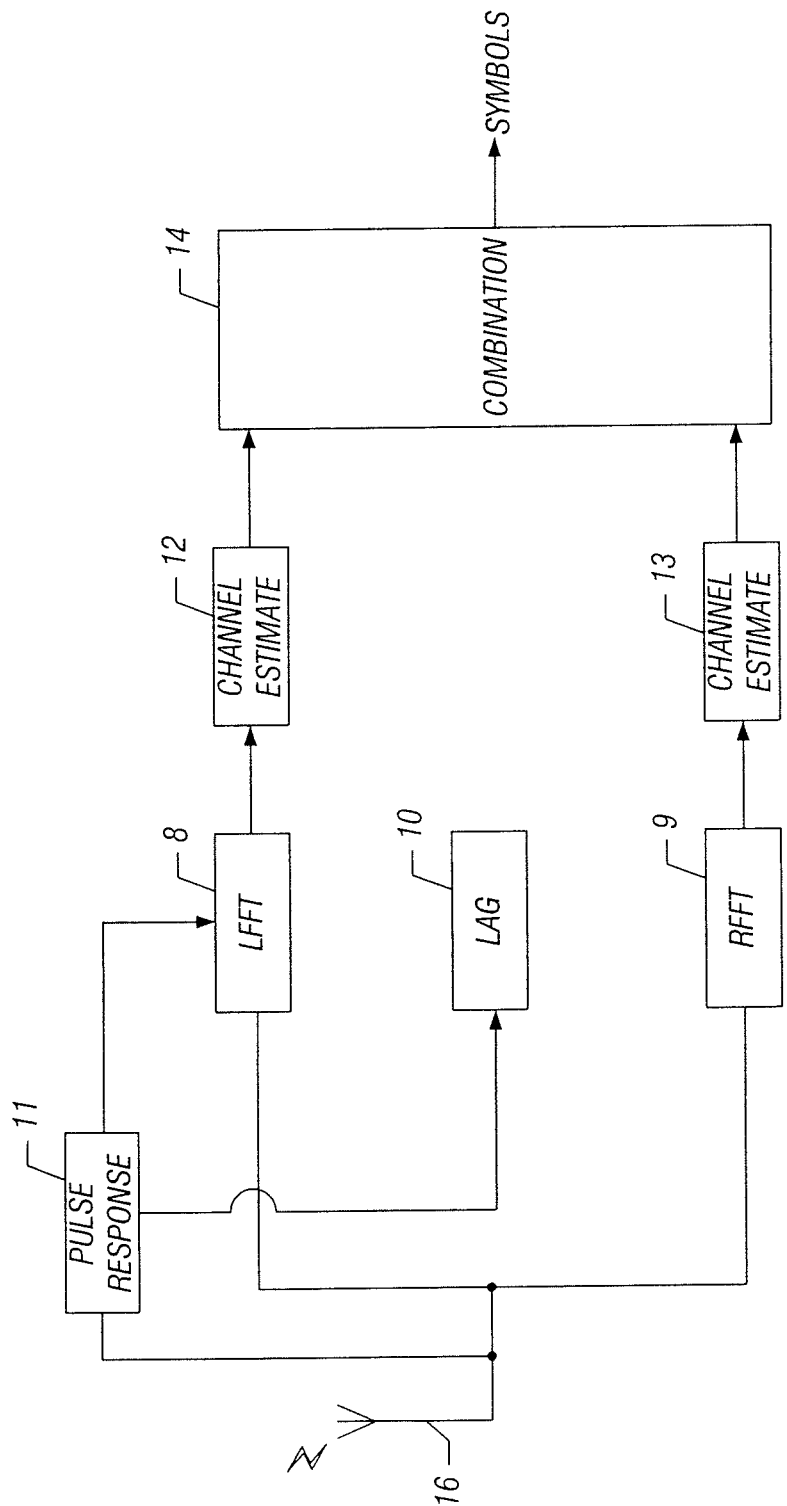
FIG. 2 is a diagram illustrating a receiver according to the invention.

The stream of data received at the receiver in FIG. 2 contains symbols $\hat{s}_m$ corresponding to respective OFDM symbols $s_m$ carried by portions of the signal transmitted over the communication channel to which the receiver is tuned.

For each OFDM symbol $\hat{s}_m$ received having a duration $T_s = T_u + T_g$, a first fast Fourier transform, called LFFT 8 (for Left FFT), is performed on a portion of the signal carrying that symbol. The calculation window for LFFT 8, i.e., the time span having a duration $T_u$ over which the LFFT 8 is performed, can be positioned in various ways. Said positioning may, for example, be the result of one of the methods described in the prior art. An advantageous example of positioning such a window will be described in greater detail below.

In addition, a second fast Fourier transform, called RFFT 9 (for Right FFT), is performed on the portion of the signal carrying the same OFDM symbol. The position of the calculation window of the RFFT 9 is established relative to the previously determined position of the LFFT 8. In effect, a time lag 10 is selected, to be observed between the LFFT 8 and the RFFT 9.

This time lag 10 may be fixed. In this case, it will be advantageously selected based on the characteristics of the environment containing the communication channel over which the signal is sent. In effect, some environments, for example relatively dense urban environments, foster multiple reflections and diffractions of radio signals, which favors the dispersal of the paths of propagation over time. However, dispersal of paths of propagation is a factor of inter-symbol interference (ISI), as explained above. In order to limit ISI, a relatively long time lag 10 is selected in this type of environment so that the LFFT 8 and the RFFT 9 calculation windows are spread over a sufficient period of time to cover the principal paths of propagation followed by the signal portion involved.

Inversely, other environments do not foster the dispersal of paths of propagation. These include, for example, rural type environments, where signals are most often propagated in a line of sight. This is also the case in wired systems, where the propagation times generally vary little. For such environments, a shorter time lag 10 can be selected, for example on the order of the duration of just a few binary elements.

It is also possible to perform other FFTs in addition to the LFFT 8 and the RFFT 9. In this case, these FFTs are also differently positioned in time, each exhibiting a certain time lag relative to the LFFT 8, for example.

In one advantageous embodiment of the invention, the LFFT 8 and the RFFT 9, as well as any other FFTs, are dynamically positioned in time based on an analysis of the pulse response 11 of the communication channel traveled by the signal sent. This embodiment is particularly interesting when the communication channel is a radio channel and the communication system to which the receiver belongs is mobile.

The pulse response 11 of the communication channel is calculated by the receiver. Advantageously, such a calculation is performed several times, for example periodically, in order to have an up-to-date estimate that takes account of the changes in the profile of propagation. In this case, the calculation can be performed for each OFDM symbol transmitted, i.e., with a period approximately equal to $T_s$. However, a longer period may also be used, when the characteristics of the channel vary less.

The pulse response 11 of the communication channel is calculated according to a conventional method. For example, the receiver involved is a rake receiver. Such a receiver estimates the pulse response of the radio channel by a series of peaks, each peak appearing with a delay corresponding to the propagation time along a specific path and having a complex amplitude corresponding to the attenuation and dephasing of the signal along that path (instantaneous fading).

A pilot channel can be provided to estimate the pulse response in the form of a succession of peaks. The pulse response is estimated by means of an adapted filter. For example, when a coded distribution access technique is used, such as the CDMA (Code Division Multiple Access) used in the UMTS system, the filter is adapted to a pilot spread code with which the transmitter modulates a sequence of known symbols, for example 1 symbols. The positions of the maximums of the output of this adapted filter give the delays used in the fingers of the rake receiver, and the associated complex amplitudes correspond to the values of said maximums.

The output of the adapted filter is then analyzed. This analysis consists of statistical calculations on the output of the adapted filter 11 to determine the delays $(\tau_i)_{0 \leq i \leq M-1}$ associated with the M paths or echoes observed, as well as the average receiving energies $(E_i)_{0 \leq i \leq M-1}$ associated with said paths.

The highest-energy paths detected correspond to principal paths dependent upon the environment. The highest-energy path will correspond, for example, to a direct path between the transmitter and the receiver if they are in direct visibility to one another. The other principal echoes will schematically be those that yield the fewest reflections and diffractions between the transmitter and the receiver.

The energy $E_i$ associated with a path is the mathematical expectation of the square of the module of the instantaneous amplitude $A_i(t)$ of reception on the corresponding path of propagation.

Figure 3:
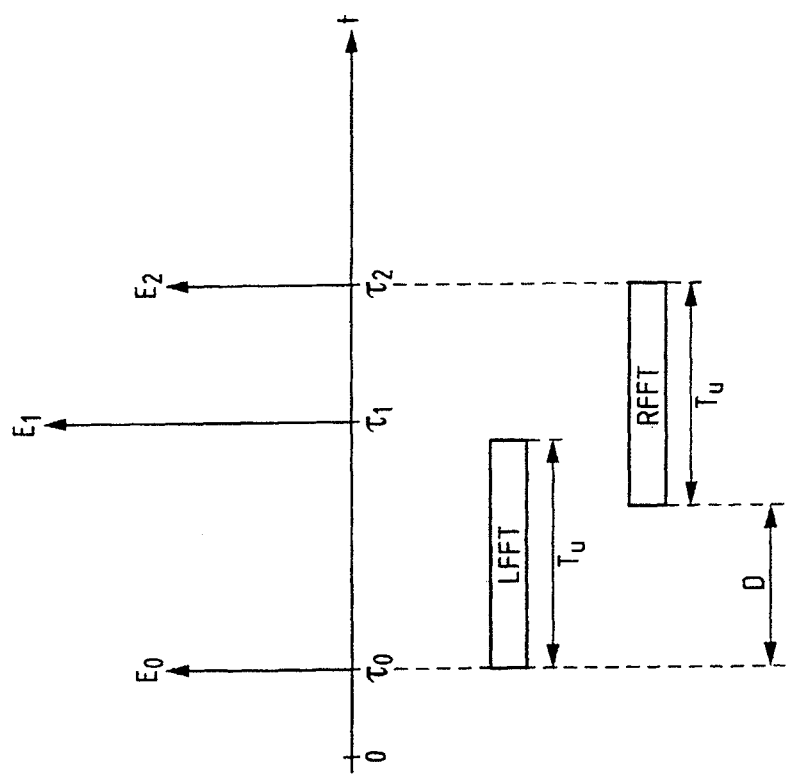
FIG. 3 is a diagram illustrating an example of implementation of the invention.

FIG. 3 schematically illustrates the principal paths, for example the paths on which an energy higher than a threshold is detected relative to the radio channel involved. Three paths are seen, characterized by their respective delays $\tau_0$, $\tau_1$ and $\tau_2$ with respect to a time reference (which itself may be determined relative to a first detected path) and by their respective energy levels $E_0$, $E_1$, and $E_2$.

In this embodiment, the estimate of the pulse response 11 is used to position the LFFT 8 and RFFT 9 calculation windows. For example, the LFFT 8 window is positioned relative to the first detected path. For example, it begins with a delay approximately equal to $\tau_0$ relative to a time reference, so as to cover the energy peak relating to the first detected path. This is what is shown in FIG. 3.

In addition, as was described above, the calculation window of the RFFT 9 is positioned relative to that of the LFFT 8 by a time lag 10. Advantageously, this time lag 10 is adjusted based on the estimated pulse response 11, as illustrated in FIG. 2. For example, this time lag, called D in FIG. 3, is selected so that the RFFT 9 window is positioned relative to the last detected path in the pulse response 11, for example so as to end approximately at the time corresponding to the delay 2 relative to said last path.

In the example illustrated in FIG. 3, it can therefore be seen that the LFFT and RFFT calculation windows are positioned so as to spread over time spans covering the principal paths of propagation characterizing the radio channel then being considered. This ensures that the two FFTs will be calculated over spans where a large quantity of energy from the signal portion involved is received. In addition, there is some degree of overlap between the calculation windows of the two FFTs, which makes it possible to increase the reliability of the calculation, as will be better understood by reading the continuation of the description.

Of course, other positionings of the fast Fourier transform calculation windows can be applied. For example, the RFFT 9 can be calculated on a window that ends after .tau.sub.2, so as to ensure that the echo of the signal portion involved corresponding to the last path on the radio channel will actually be received this window.

Referring to FIG. 2, the use of the FFT calculations performed is described below. As indicated above, each FFT makes it possible to estimate data elements $\hat{X}_{n,0}$, $\hat{X}_{n,1}$, ... $\hat{X}_{n,N-1}$ each corresponding to one of the frequency sub-carriers used, in order to obtain an estimate $\hat{X}_n$ of the transmitted data $X_n$ corresponding to the content of the OFDM symbol $\hat{S}_m$ received.

Furthermore, for each FFT calculated, an estimate is made of the radio channel over which the signal is sent. So an estimate of channel 12 is made at the output of the calculation module of the LFFT 8 and an estimate of channel 13 is made at the output of the calculation module of the RFFT 9. Numerous known methods can be used to estimate the channel. For example, the least squares method can be used.

Figure 1:
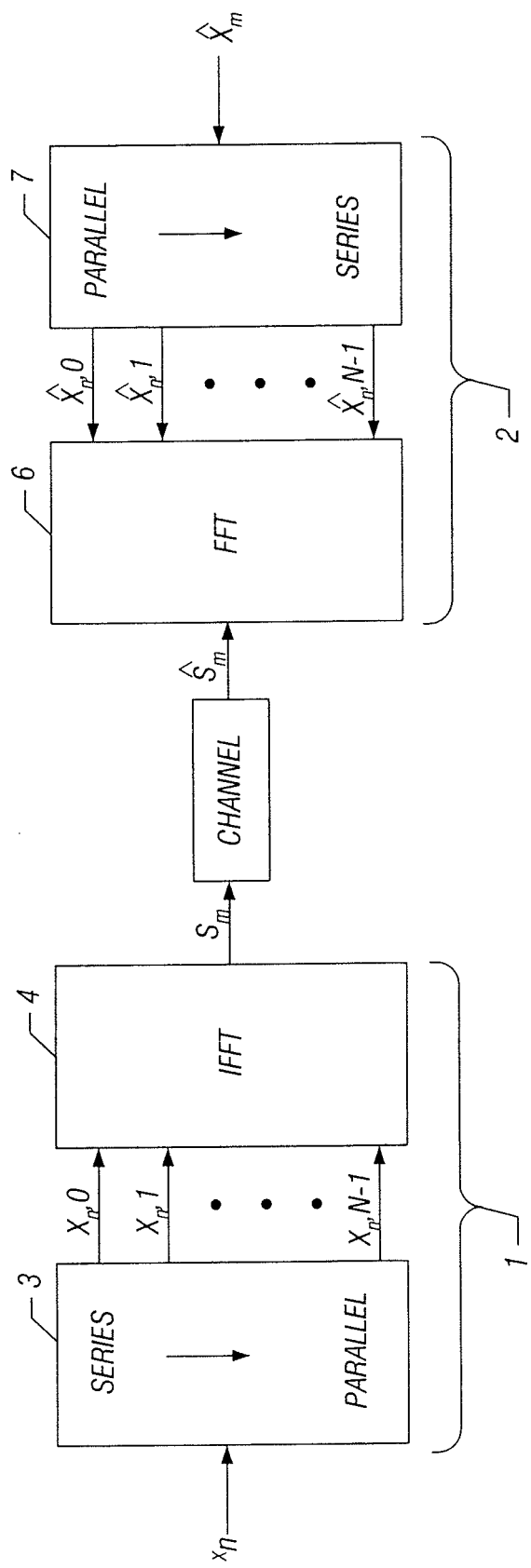

According to this last method, the channel estimate module 12 estimates parameters $r_0$, $r_1$, ..., $r_n$ corresponding to disturbances appearing on the radio channel, such that $\hat{X}_k = r_0 X_k + r_1 X_{k-1} + \ldots r_n X_{k-n} + W_k$, where k is an integer greater than n, $X_i$ is the data corresponding to the $i^{th}$ OFDM symbol transmitted ($X_i$ may, for example, be the $X_n$ of FIG. 1), $\hat{X}_k$ is the estimate corresponding to the $k^{th}$ OFDM symbol received, which follows the calculation of the LFFT 8 (for example, $\hat{X}_n$ in FIG. 1), and $W_k$ is a first estimate of the noise affecting the radio channel over which the OFDM symbols are being sent. In order to estimate the parameters $r_0$, $r_1$, ..., $r_n$, pilot bits transmitted over the radio channel and known to the receiver are conventionally used.

Similarly, the channel estimate module 13 estimates parameters $r'_0$, $r'_1$, ..., $r'_n$, such that $\hat{X}_k = r'_0 X_k + r'_1 X_{k-1} + \ldots r'_n X_{k-n} + W'_k$, where k is an integer greater than n, $\hat{X}_k$ is the estimate corresponding to the $k^{th}$ OFDM symbol received, which follows the calculation of the RFFT 9, and $w'_k$ is a second estimate of the noise affecting the radio channel over which the OFDM symbols are being sent.

A combination module 14 is then used to make an estimate of the data corresponding to the OFDM symbols sent, on the basis of the elements sent by the channel estimate modules 12 and 13. If the least squares method has been used to estimate the channel, the module 14 can then proceed as follows. A vector $\tilde{X}$ is defined as a concatenation of the 2k+2 estimates $\hat{X}_0, \hat{X}_1, \ldots, \hat{X}_k$ and $\hat{X}_0, \hat{X}_1, \ldots, \hat{X}_k$ made after the channel estimates made respectively by the modules 12 and 13. In addition, a first convolution matrix R is defined based on the parameters $r_0$, $r_1$, ..., $r_n$ estimated by the channel estimate module 12. This matrix R, whose dimensions are (k+1)(k+1), has the following structure:

$$R = \begin{pmatrix} r_0 & 0 & 0 & \ldots & \ldots & \ldots & \ldots & \ldots & \ldots & 0 \\ r_1 & r_0 & 0 & & & & & & & 0 \\ r_2 & r_1 & r_0 & \ldots & & & & & & 0 \\ \ldots & r_2 & r_1 & \ldots & \ldots & & & & & 0 \\ r_n & \ldots & r_2 & \ldots & \ldots & \ldots & & & & 0 \\ 0 & r_n & \ldots & \ldots & \ldots & \ldots & & & & 0 \\ 0 & 0 & r_n & & \ldots & \ldots & \ldots & & & 0 \\ 0 & 0 & 0 & \ldots & & & & & & \ldots \\ \ldots & \ldots & \ldots & \ldots & & & \ldots & \ldots & & 0 \\ 0 & 0 & 0 & \ldots & 0 & r_n & \ldots & r_2 & r_1 & r_0 \end{pmatrix}$$

Similarly, a second convolution matrix R' is defined based on the parameters $r'_0, r'_1, \ldots, r'_n$ estimated by the channel 13 estimate module. This matrix R', whose dimensions are (k+1)*(k+1), has the following structure:

$$R = \begin{pmatrix} r'_0 & 0 & 0 & \ldots & \ldots & \ldots & \ldots & \ldots & \ldots & 0 \\ r'_1 & r'_0 & 0 & & & & & & & 0 \\ r'_2 & r'_1 & r'_0 & \ldots & & & & & & 0 \\ \ldots & r'_2 & r'_1 & \ldots & \ldots & & & & & 0 \\ r'_n & \ldots & r'_2 & \ldots & \ldots & \ldots & & & & 0 \\ 0 & r'_n & \ldots & \ldots & \ldots & \ldots & & & & 0 \\ 0 & 0 & r'_n & & \ldots & \ldots & \ldots & & & 0 \\ 0 & 0 & 0 & \ldots & & \ldots & \ldots & \ldots & \ldots & \ldots \\ \ldots & \ldots & \ldots & \ldots & \ldots & & \ldots & \ldots & \ldots & 0 \\ 0 & 0 & 0 & \ldots & 0 & r'_n & \ldots & r'_2 & r'_1 & r'_0 \end{pmatrix}$$

Lastly, a vector X is defined, which includes all the k+1 quantities of data $X_0, X_1, \ldots, X_k$ corresponding to the OFDM symbols sent, which need to be determined.

It is then possible to write the following equation: $\hat{X} = M \cdot X$, where M represents a column concatenation matrix of the block matrices R and R', i.e., $$M = \begin{pmatrix} R \\ R' \end{pmatrix}.$$

This matrix M thus has 2k+2 lines and k+1 columns.

The noises $w_k$ and $w'_k$ introduced above are delayed from one another due to the lag 10 existing between the two FFTs performed, so they are independent and do not enter into the equation system to detect the value of the symbols sent.

The vector X can then be estimated as the product of $(M^H M)^{-1} \cdot M^H \cdot \hat{X}$, where the operator $(\cdot)^H$ is the conjugated transpose.

Of course, many methods other than the least squares method can be used to estimate the channel. In this case, the estimate of the vector X will be adapted to the method used (for example, one of the following methods: a posteriori maximum, MLSE (Maximum Likelihood Sequence Estimator), Viterbi algorithm, etc.).

Once the combination is performed by the module 14, an estimate is obtained of the data $X_0, X_1, \ldots, X_k$ corresponding to the signals sent. The reliability of this estimate is greater than that of those obtained by conventional methods because it relies on a combination of estimates made as a result of two different observations. Furthermore, as was indicated above, the time lag between the FFTs makes it possible to achieve some data redundancy which is taken advantage of in the combination 14, all the while ensuring that the final estimate is based on the highest-energy, and therefore the most significant, echoes.

It will be noted that the principles discussed above can be implemented by using a computer program containing the corresponding instructions and run, for example, by a processing unit in the receiver involved.

The invention claimed is:

1. A method of estimating symbols in a digital signal received over a communication channel, the symbols being multiplexed on orthogonal frequency sub-carriers, the method comprising:
estimating at least one communication channel parameter from predetermined information contained in the digital signal and
for at least one symbol:
performing a transform on at least one portion of the received signal that is substantially shorter than a duration of a symbol;
performing a transform on a first portion of the received signal to provide a first set of frequency domain parameters, the first portion substantially corresponding to at least part of the symbol;
performing the transform on a second portion of the received signal to provide a second set of frequency domain parameters, the second portion substantially corresponding to at least part of the symbol, and the first and second portions being separated by a predetermined time shift; and
estimating the symbol from a combination of the first and second sets of frequency domain parameters, and at least one estimated communication channel parameter.

2. The method of claim 1, wherein estimating at least one communication channel parameter comprises estimating an impulse response of the communication channel.

3. The method of claim 1, wherein estimating at least one communication channel parameter comprises estimating an impulse response of the communication channel, and wherein the time shift is based on the estimated impulse response of the communication channel.

4. The method of claim 3, further comprising:
determining a delay between energy peaks in the estimated impulse response; and
setting the time shift based on the determined delay.

5. The method of claim 1, wherein estimating at least one communication channel parameter comprises estimating an impulse response of the communication channel, wherein the time shift is based on the estimated impulse response of the communication channel, and wherein the impulse response of the communication channel is estimated periodically.

6. The method of claim 1, wherein:
estimating at least one communication channel parameter from predetermined information contained in the digital signal comprises:
estimating the communication channel based on the transform performed on the first portion to obtain a first set of estimated communication channel parameters; and
estimating the communication channel based on the transform performed on the second portion to obtain a second set of estimated communication channel parameters; and
estimating the symbol from a combination of the first and second sets of frequency domain parameters, and at least one estimated communication channel parameter, comprises estimating the symbol from a combination of the first and second sets of frequency domain parameters and the first and second sets of estimated communication channel parameters.

7. The method of claim 6, wherein estimating the communication channel comprises using a channel estimation technique selected from a group consisting of:
least squares method;
maximum a posteriori method;
maximum likelihood sequence estimator method; and
Viterbi method.

8. The method of claim 1, wherein the transform is a fast Fourier transform.

9. The method of claim 1, wherein the time shift is predetermined based on characteristics of an environment in which the communication channel is located.

10. The method of claim 1, wherein the communication channel is a radio channel.

11. A receiver for receiving a digital signal transmitted over a communication channel, the symbols being multiplexed on orthogonal frequency sub-carriers, the receiver comprising:
channel estimation logic operable to estimate at least one communication channel parameter from predetermined information contained in the digital signal;
transform logic operable for each symbol:
to perform a transform at least one portion of the received signal that is substantially shorter than a duration of a symbol;
to perform a transform on a first portion of the received signal to provide a first set of frequency domain parameters, the first portion substantially corresponding to at least part of the symbol;
to perform a transform on a second portion of the received signal to provide a second set of frequency domain parameters, the second portion substantially corresponding to at least part of the symbol; and the first and second portions being separated a predetermined time shift; and
symbol estimation logic operable for each symbol to estimate the symbol from a combination of the first and second sets of frequency domain parameters, and the at least one estimated communication channel parameter.

12. The receiver of claim 11, wherein the channel estimation logic is operable to estimate an impulse response of the communication channel.

13. The receiver of claim 12, wherein the time shift between the first and second portions of the received signal on which the transform is performed is based on the estimated impulse response of the communication channel.

14. The receiver of claim 13, further comprising:
delay determination logic operable to determine a delay between energy peaks in the estimated impulse response; and
time shift setting logic operable to set the predetermined time shift based on the determined delay.

15. The receiver of claim 12, wherein the channel estimation logic is operable to estimate the impulse response of the communication channel periodically.

16. The receiver of claim 11, wherein the channel estimation logic is operable to estimate at least one communication channel parameter from predetermined information contained in the digital signal by:
estimating the communication channel based on the transform performed on the first portion to obtain a first set of estimated communication channel parameters; and
estimating the communication channel based on the transform performed on the second portion to obtain a second set of estimated communication channel parameters; and
wherein the symbol estimation logic is operable to estimate the symbol from a combination of the first and second sets of frequency domain parameters, and at least one estimated communication channel parameter, by estimating the symbol from a combination of the first and second sets of frequency domain parameters, and the first and second sets of estimated communication channel parameters.

17. The receiver of claim 11, wherein the channel estimation logic is operable to estimate the communication channel by using a channel estimation technique selected from a group consisting of:
least squares method;
maximum a posteriori method;
maximum likelihood sequence estimator method; and
Viterbi method.

18. The receiver of claim 11, wherein the transform logic is operable to perform Fast Fourier transforms.

19. The receiver of claim 11, wherein the time shift is performed is predetermined based on characteristics of an environment in which the communication channel is located.

20. The receiver of claim 11, wherein the communication channel is a radio channel.

* * * * *